United States Patent [19]

Ernst et al.

[11] 3,981,610
[45] Sept. 21, 1976

[54] WATER PUMP

[75] Inventors: Horst M. Ernst, Eltingshausen;
Manfred Brandenstein, Aschfeld;
Armin Olschewski, Schweinfurt, all
of Germany

[73] Assignee: SKF Industrial Trading and Development Company, B.V., Amsterdam, Netherlands

[22] Filed: Oct. 17, 1974

[21] Appl. No.: 515,651

[30] Foreign Application Priority Data
Nov. 2, 1973 Germany............................. 7339167

[52] U.S. Cl. ....................... 415/291 C; 123/41.12; 415/170 A
[51] Int. Cl.² ...................... F04D 29/44; F04D 7/02
[58] Field of Search........ 415/170 A, 219 C, 173 A; 308/180; 295/36 A; 123/41.12

[56] References Cited
UNITED STATES PATENTS

| | | | |
|---|---|---|---|
| 2,206,488 | 7/1940 | Pavlecka et al.................. | 415/219 C |
| 2,365,065 | 12/1944 | Frankenfield.................... | 415/219 C |
| 2,470,071 | 5/1949 | Hilton................................ | 308/180 |
| 2,568,646 | 9/1951 | Little................................ | 415/219 C |
| 3,306,223 | 2/1967 | Liebig.............................. | 415/173 A |
| 3,632,220 | 1/1972 | Lansinger....................... | 415/219 C |
| 3,723,029 | 3/1973 | Laing............................... | 123/41.12 |
| 3,861,170 | 1/1975 | Asberg............................ | 415/219 C |
| 3,871,790 | 3/1975 | Rameau.......................... | 415/219 C |

FOREIGN PATENTS OR APPLICATIONS 57,560   3/1919   Sweden............................ 295/36 A

*Primary Examiner*—Henry F. Raduazo
*Attorney, Agent, or Firm*—Murray Schaffer

[57] ABSTRACT

A water pump for motor vehicles having a pump wheel arranged at the end of a shaft. A belt driven pulley is connected to the shaft for rotating the shaft and a bearing journals the shaft. The bearing has a fixed race, a rotatable race and two rows of roll bodies located therebetween. The shaft and the pulley are integrally connected to the rotatable race and the pulley has a rim for receiving a drive belt extending about the bearing so that the line of application of the force acting on the bearing lies between the two rows of roll bodies.

9 Claims, 2 Drawing Figures

3,981,610

WATER PUMP

BACKGROUND OF THE INVENTION

The present invention relates to a water pump for motor vehicles and in particular to means for driving and journalling the shaft for the pump wheel.

In motor vehicles, water pumps are provided in association with the cooling system of the motor. The water pump comprises a pump wheel which is secured at the end of an elongated shaft journalled for rotation in a bearing and having a belt driven pulley secured to it. The bearing usually comprises a double row radial bearing provided with extensive sealing elements to prevent the entry of water or other impurities. The outer race ring of the bearing is fixed against rotation in a suitable flange extending from the motor housing. The drive pulley is usually force fit over the end of the shaft. This generally known construction has a drawback in that they comprise a plurality of individual parts which must be joined together either in manufacture or in installation. This results in an expensive, complicated construction as well as in a construction which is capable of being easily damaged. Further the known constructions require a great deal of care and attention to insure a balanced operation and a smooth rotation during installation. Since, generally built-in bearings are used which require forced installation into the supporting housing, severe difficulties are encountered in maintaining the proper tolerances in both the axial and radial spacings. As a result, bearing play is created which differs for individual bearings in each installation. Should such bearing play become too great, the revolving masses of the pump cause the parts to vibrate uncontrollably thus creating an undesirable and noticeable noise as well as creating excessive wear in critical areas and eventually the breakdown of the bearing itself.

It is the object of the present invention to provide an improved system for journalling and driving the shaft of a motor vehicle water pump which overcome the drawbacks of the known systems.

It is another object of the present invention to provide a system for journalling and driving a motor vehicle water pump which has a long operating life and is simple and inexpensive to manufacture.

It is still another object of the present invention to provide a water pump for motor vehicles which is sealed against entry of water and which provides a well balanced and smooth operation.

The foregoing objects, other objects, as well as the numerous advantages of the present invention, will be seen from the foregoing disclosure.

SUMMARY OF THE INVENTION

According to the present invention a water pump for motor vehicles is provided in which the pump wheel is secured to a shaft journalled in a double row roll bearing. A belt driven pulley is integrally secured to the shaft forming therewith a unitary piece and is arranged in association with the bearing so that its belt retaining rim is located such that the line of action of the driving force on the bearing runs between the two rows of roll bodies.

The stationary race ring of the bearing can be either the inner or outer race ring and is preferably provided with a radially extending flange adapted to be secured directly to the motor housing.

The individual parts are joined in a unitary assembly enabling easy packing and subsequent installation as a unit.

Full details of the present invention are given in the following description and are shown in the accompanying drawings.

DESCRIPTION OF THE INVENTION

Figures 1, 2:
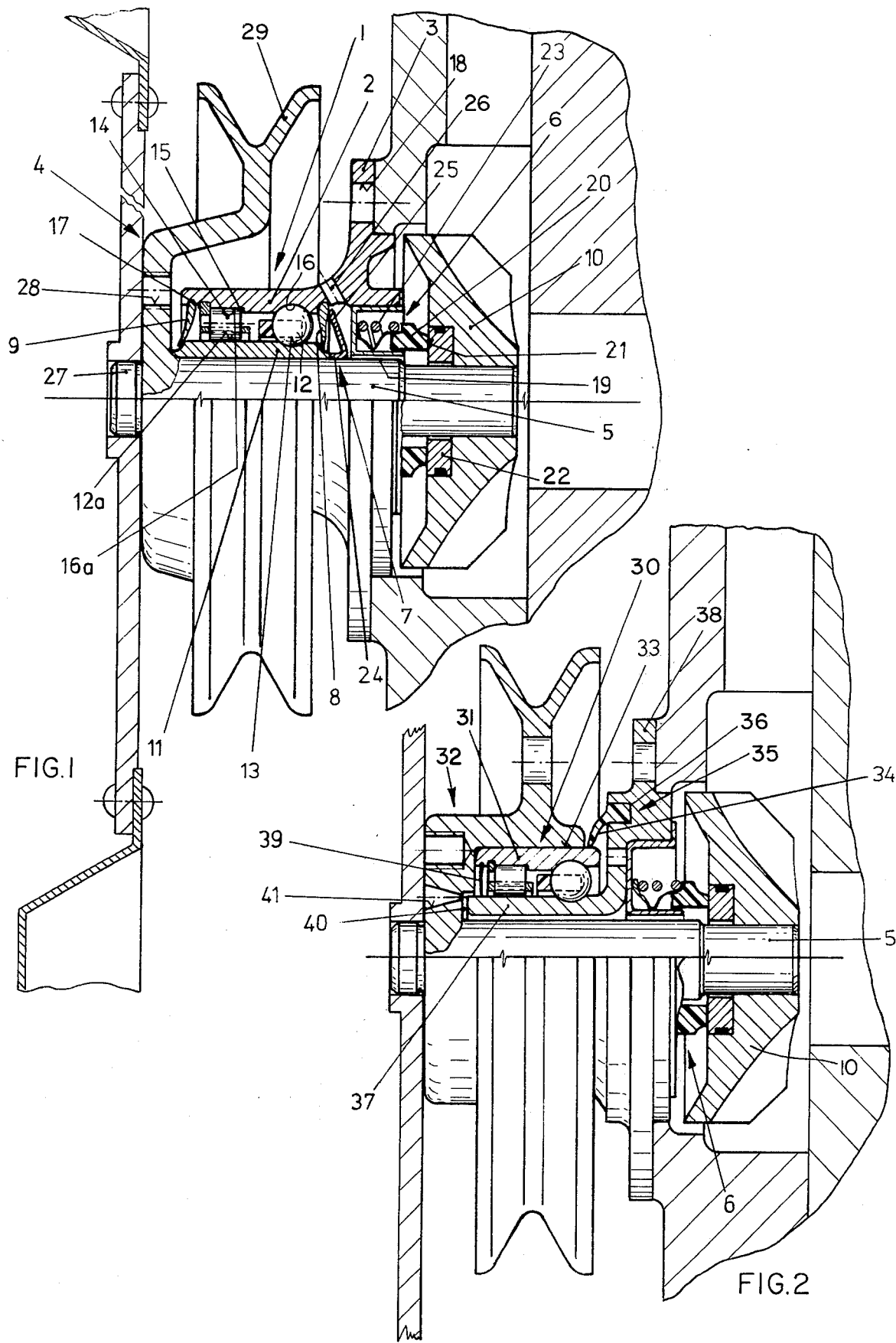
FIG. 1 is a side elevational view, partially in section, showing a water pump embodying the present invention and having a double row bearing in which the inner race ring rotates.
FIG. 2 is a similar view of another embodiment of the present invention wherein the outer race ring rotates.

In both FIGS. 1 and 2 a water pump for motor vehicles of the same general construction are shown and in each similar parts are denoted with the same reference numerals. The pump wheel, its shaft, pulley and journal are shown while the remaining parts of the water pump particularly the motor are omitted from the drawing since these parts are conventional and well known.

Turning first to FIG. 1, a double row anti-friction bearing is shown generally depicted by the numeral 1. The bearing 1 has a stationary outer race ring 2 which is provided with an annular integrally formed flange 3 by which the bearing is adapted to be secured to the vehicle motor. A belt driven pulley 4 is integrally formed, such as by casting, or welding or the like with a shaft 5 which extends through the bearing 1. Suitable seals preventing entry of the water are provided as generally depicted by the parts bearing reference numerals 6, 7, 8 and 9. A pump wheel 10 is secured at the end of the shaft 5. The inner race ring of the bearing, generally depicted by the numeral 11 is fixedly arranged to the shaft 5. The race ring 11 and the shaft 5 may be simultaneously cast or welded together or otherwise formed integrally with each other so as to be conjointly rotatable. The seal 7 is a centrifugal disc which is formed together with the inner race ring.

The inner race ring 11 is provided with a circular groove 12 and a cylindrical surface 12a adapted to form the running surfaces of a row of balls 13 and a row of cylindrical roll bodies 14 respectively. The outer race ring 2 is provided with a circular groove race surface 16 for the balls 13 and with a stepped shoulder 15 and a cylindrical surface 16a to form the supporting running surfaces for the cylindrical roll bodies 14. A C-ring 17 or other snap ring sits within an annular groove in the outer race ring 2 so as to axially fix the roll bodies 14 against the shoulder 15.

The attachment flange 3 is integrally formed with the outer race ring 2, at one end, and is provided with a plurality of axial holes 18 spaced about its periphery, by which it may be secured by bolts or similar fastening means to the motor of the vehicle (not otherwise shown). The outer race ring 2 extends axially beyond the flange 3 and is radially spaced from the shaft 5 to surround the end seal 6 which is interposed between the pump wheel 10 and the bearing 1. The end seal 6 consists of a U-shaped sheet metal housing 19 open toward the pump wheel 10 which is set within the annular space between the shaft 5 and the outer bearing extension. An axially movable seal ring 20 is seated in the sheet metal housing 19 and has an annular running surface 21 adapted to be pressed against a cooperating ring 22 which is seated within the outer face of the pump wheel 10. A compression spring 23 axially arranged within the housing 13 biases the seal ring 20 into continual engagement with the cooperating ring 22. The seal rings 20 and 22 may be formed of suitable low friction plastic material such as Teflon or metals such as bronze, etc.

The seal member 7 is formed of sheet metal or the like and is connected to the rotating shaft 5 or to the inner race ring 11 by a connecting portion 24 which extends to form a centrifugal disc 25 arranged at an angle to the axis of the shaft 5. The sealing disc 7, and particularly the centrifugal disc 25 acts as a back-up for the running seals 20 and 22 and is adapted to centrifugally drive any water escaping from the pump outwardly from about the periphery of the shaft out of one or more drainage holes 26 located in the outer race ring 2.

The seal ring 8 is made of resilient flexible plastic or similar material and is set along its outer peripheral edge within an annular groove formed in the inner surface of the outer race ring 2 and has an inner peripheral edge resting on a hollow fillet or chamfer provided on the surface of the inner race ring 11. On the opposite side of the bearing the seal member 9, similar in construction and arrangement to that of seal 8, prevents the introduction of impurities and the escape of any lubricant inserted within the bearing. The seal 9 is held in a groove formed in the inner surface of the outer race ring and rides on a hollow fillet or chamfer formed on the inner ring.

The belt driven pulley 4 is made in one piece with a shaft 5 and is provided at its center with a lug 27 adapted to receive the fan vane (not shown). The pulley 4 has a central hub extending substantially in a plane perpendicular to the shaft 5, in which a plurality of holes 28 are provided to receive means for holding the fan blades (also not shown). The pulley 4 has a peripheral V-shaped rim 29, adapted to receive a conventional drive belt, which is driven by the motor through a suitable transmission or linkage or by a separate pump motor. The V-shaped rim 29 is set back axially from the central hub so that the line of force exerted on the bearing runs between the two rows of roll bodies 13 and 14 respectively. That is the line of force exerted by the belt lies in a plane perpendicular to the shaft and intersecting the bearing and shaft between the balls 13 and the cylindrical roll bodies 14. As a result the forces placed on the bearing are equally distributed between the roll bodies.

It will be appreciated that the entire pump arrangement can be assembled as a unit, with a pulley shaft, inner race ring and centrifugal disc formed as an integral unit while the parts of the outer race, seals 6, 8 and 9 can similarly be prejoined with a pump wheel. The seals prevent entry of water and other impurities and maintain the bearing lubricant from spilling out, during manufacture, storage, transportation and subsequent installation.

In FIG. 2 a water pump similar to that of FIG. 1 is shown. However, in contrast to the embodiment of FIG. 1 has a bearing 30 of which the outer race ring 31 rotates. In this example, a double row bearing 30 having cylindrical roll bodies and balls, similar to that previously shown is also used. Such a bearing easily compensates for any axial changes in length which might occur during warming up of the motor and is thus preferred. The belt pulley 32 is similar to that shown in FIG. 1 except that it has an enlarged central bore which receives the outer race ring 31 which may be keyed or otherwise secured to the pulley 32 and jointly rotatable with it. The outer race ring 31 extends axially beyond the pulley 32 on the side of the pump wheel 10 so that a lip 34 of a flexible resilient packing ring 35 which is inserted in an axial groove 36 formed in the radial flange of the stationary inner race ring 37, can seat on the axially projecting portion of the outer rotatable race ring 31. The inner race ring 37 is provided with a radially extending annular flange 38, in which the groove 36 is formed and which is adapted to be secured to the motor and thus render the inner race ring 37 stationary. The bore of the inner race ring is greater in diameter than the shaft and is spaced from the shaft to allow the shaft to rotate freely. The annular flange 38 is cup-shaped in cross section and has an enlarged inner bore facing the wheel pump 10 in which the seal member 6, similar in construction to that shown in FIG. 1 is set.

At the other end of the bearing a plastic flexible packing disc 39 is seated in a circular groove formed on the inner surface of the outer race ring and extends to rest upon the surface of the inner race ring 37, much in the manner as the packing seal member 9 shown previously in FIG. 1. A radial labyrinth gap 40 is provided between the end of the inner race ring and the hub of the pulley 32, which hub is provided with a plurality of axial holes 41 having a conical cross section. The larger end of the holes 41 face outwardly so that any water which may enter the bearing can be centrifuged outwardly.

As in FIG. 1, the embodiment shown in FIG. 2 has its pulley 32 provided with a V-shaped rim which is adapted to retain a similarly formed belt which drives the pulley. The V-shaped rim is set back along the hub of the pulley so that the line of force exerted by the belt through the pulley onto the bearing runs between the two rows of roll bodies of the double row bearing of FIG. 2. As in FIG. 1 the line of force is within a plane perpendicular to the shaft and intersecting both the bearing and the shaft between these two rows of roll bodies.

It was seen from both embodiments that the fixed and rotatable race rings may be easily interchanged while still maintaining the arrangement of the rim between the roll bodies of the bearings and maintaining the integral construction of the pulley shaft and rotating race rings. Various other changes and modifications have been suggested and numerous others will be obvious to those skilled in the present art. It is intended therefore that the disclosure be taken as illustrative only of the invention and not limiting of its scope.

What is claimed is:

1. A water pump for motor vehicles comprising a pump housing, a pump wheel located within said housing and arranged at the end of a shaft, a belt driven pulley for rotating said shaft and a bearing independent of said pump for journalling said shaft, said bearing comprising a fixed race ring having a radially extending flange integrally formed therewith for attachment to the motor of said vehicle, a rotatable race ring and a pair of parallel rows of roll bodies located therebetween, said pulley and said shaft being integrally connected to said rotatable race ring for conjoint rotation therewith, said pulley having a rim for receiving a drive belt extending about said bearing, said rim being arranged so that the line of force applied thereto by the belt lies in a plane extending between the two rows of roll bodies.

2. The water pump according to claim 1 wherein said rim is arranged so that the lines of force applied thereto lie equally between said roll bodies transversely of the axis of rotation of said shaft and parallel to said radially extending flange.

3. The water pump according to claim 1 including a fan said belt pulley being provided with a centering attachment on the side facing away from said bearing and means for fixing said fan thereto.

4. The water pump according to claim 1 wherein one row of roll bodies comprise balls and the other row comprise cylindrical rollers, said race rings having race surfaces conforming thereto.

5. The water pump according to claim 1 wherein the fixed race is the inner bearing race.

6. The water pump according to claim 1 wherein the fixed race is the outer bearing race.

7. The water pump according to claim 1 wherein the fixed race is the inner bearing race and said race is radially spaced from said shaft, said pulley having a radially extending hub spaced from the end of said inner race opposite the pump wheel and forming a labyrinth gap with said web and having a plurality of axially directed holes communicating with said gap and extending outwardly therefrom.

8. The water pump according to claim 7 wherein said holes are conically tapered outwardly and are uniformly distributed about the axis of said shaft.

9. The water pump according to claim 1 wherein said fixed ring includes an annular packing ring secured on said flange resiliently seating on the outer surface of said rotatable ring.

* * * * *